Aug. 20, 1957

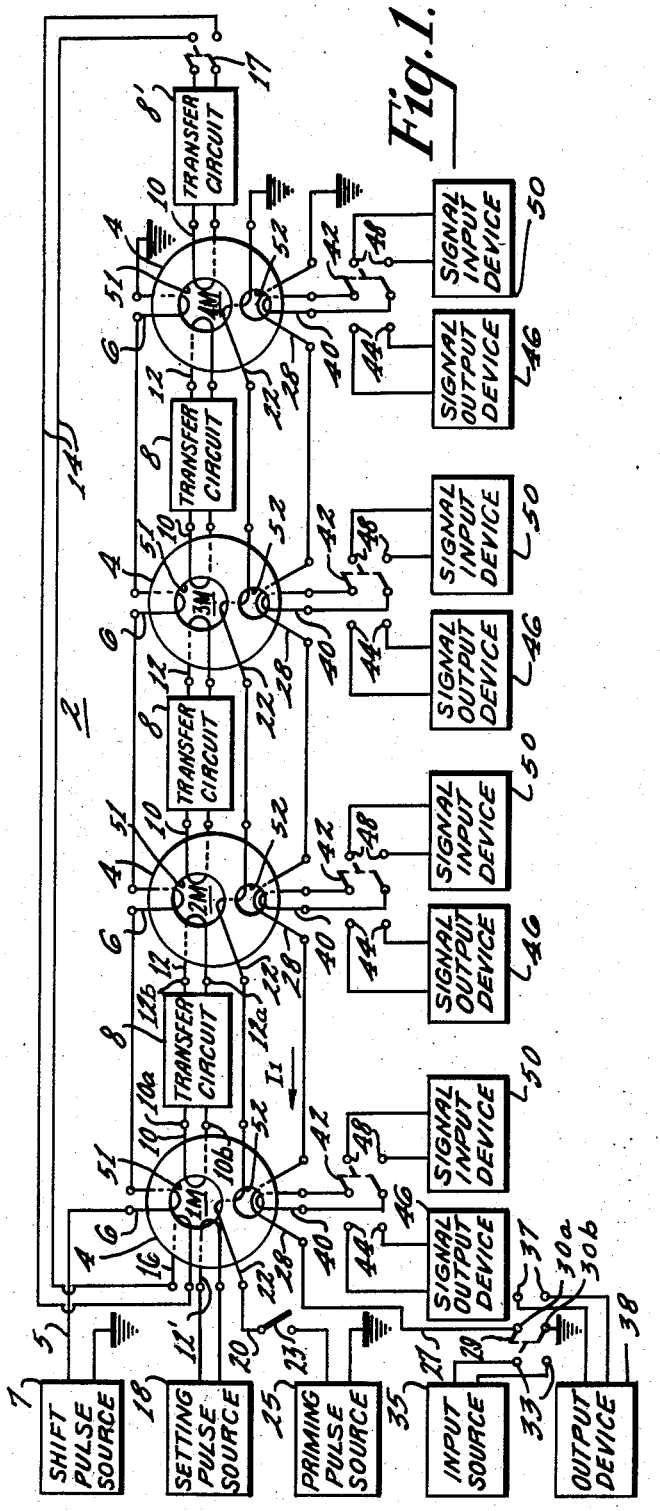

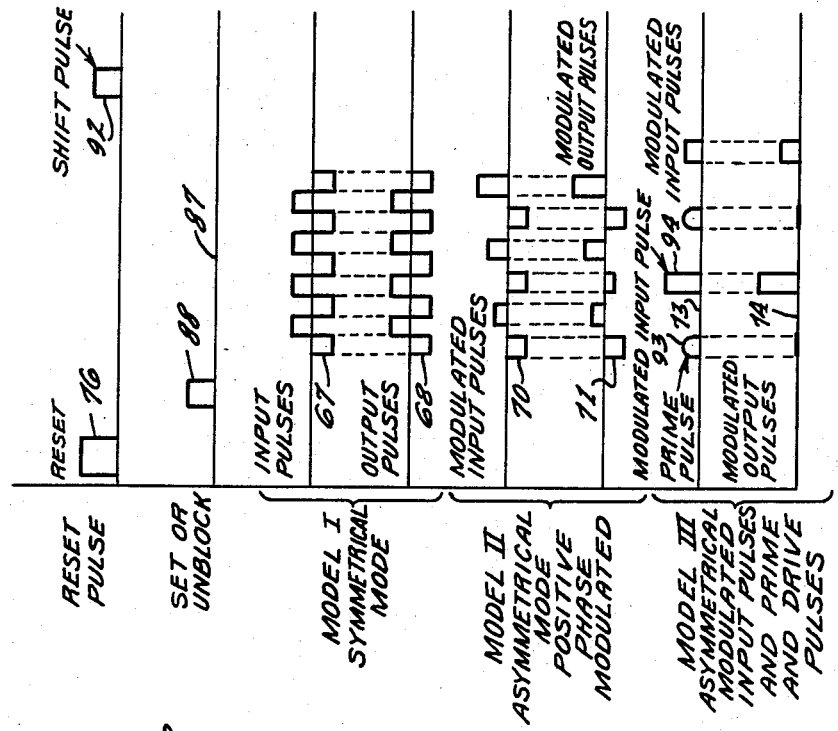
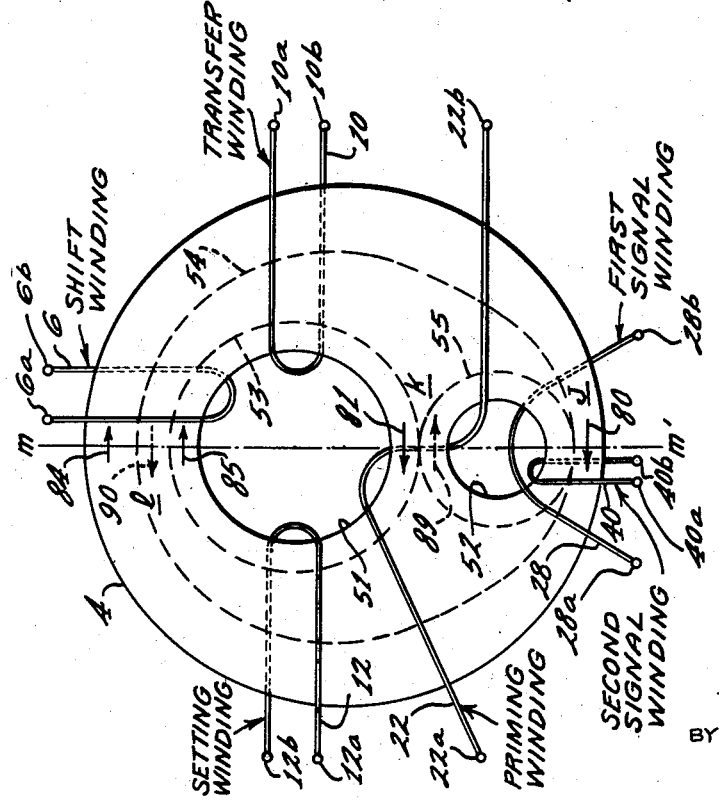
Fig. 3.
Fig. 2.
INVENTORS
Jan A. Rajchman,
Arthur W. Lo &
George R. Briggs
BY
ATTORNEY

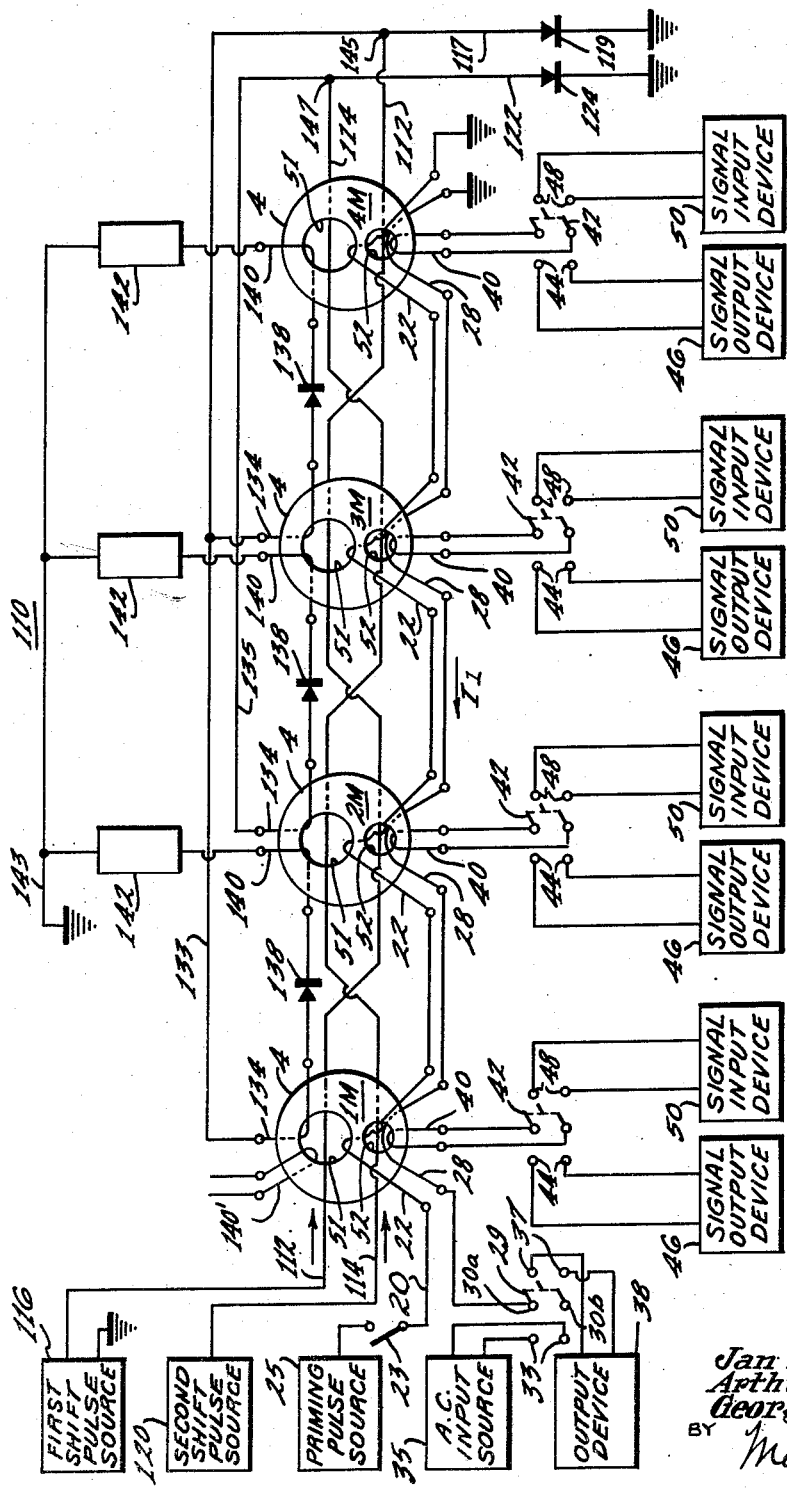

J. A. RAJCHMAN ET AL 2,803,812

ELECTRIC CONTROL SYSTEMS

Filed May 31, 1955

INVENTORS
Jan A. Rajchman,
Arthur W. Lo &
George R. Briggs
BY
Morris␣␣␣␣␣
ATTORNEY

United States Patent Office 2,803,812
Patented Aug. 20, 1957

2,803,812

ELECTRIC CONTROL SYSTEMS

Jan A. Rajchman, Princeton, Arthur W. Lo, Elizabeth, and George R. Briggs, Princeton, N. J., assignors to Radio Corporation of America, a corporation of Delaware Application May 31, 1955, Serial No. 511,916

19 Claims. (Cl. 340—174)

This invention relates to electric control systems, and more particularly to electric systems utilizing magnetic elements in the exercise of control.

Systems for commutating an electric signal appearing in an input channel to a selected one of a plurality of output channels, and systems for selectively distributing signals appearing in a plurality of input channels to a common output channel are known. The present invention is applicable to many types of electric control systems for commutating and distributing electric signals. For example, the present invention may be useful in multiplexing systems for channeling signals representing intelligence, in remote control systems such as are used in telemetering applications, in teleprinting systems, in systems for transmitting modulated signals to and through a selected channel, and for many such other purposes.

It is an object of the present invention to provide an improved system for controlling the transmission of electric signals, representing, for example, either intelligence or power, to selected ones of a plurality of load devices consecutively, that is, sequentially, by means of magnetic elements under the control of a shifting pulse.

Another object of the present invention is to provide an improved distributor system employing magnetic elements for controlling the transmission of electric signals, representing, for example, either intelligence or power, to selected ones of a plurality of input channels.

Still another object of the present invention is to provide an improved magnetic system for controlling the transmission of modulated electric signals to or from a selected one of a plurality of channels.

A copending application, Serial No. 473,709, entitled Magnetic Systems, filed by Jan. A. Rajchman, describes various transfluxors and various methods of operation thereof. Briefly, a transfluxor includes magnetic material characterized by a substantially rectangular hysteresis loop. There are a plurality of closed flux paths in the material. The plurality of closed paths can be achieved by fabricating apertures in the material. The closed paths are then taken about one or more of the apertures. A selected one of the flux paths has at least two portions, each respectively in common with two other flux paths.

Excitation means are provided to excite selectively two portions of the selected path either to the same state of saturation at remanence along the selected path or to opposite states of saturation at remanence along the selected path. An alternating magnetizing current is employed to apply alternating magnetizing forces along the selected path.

By suitable means, for example, an output winding linking the selected path, a response may be derived from the transfluxor depending upon whether the selected path portions are in the same state or in opposite states of remanence with respect to the selected path. When the selected path portions are in the same state of saturation at remanence, the alternating magnetizing current produces flux changes in the selected path; these flux changes induce signals in the output winding linking the path. In this condition the transfluxor may be considered to be in an unblocked state. In a second condition, when the two selected path portions are in opposite states of saturation at remanence along the selected path, the alternating magnetizing current produces substantially no flux changes along the selected path and, consequently, substantially no output signals are induced in the output winding. This second response condition of the transfluxor may be considered to be a blocked condition.

The amount of material in the selected path portions magnetized in the same state of saturation at remanence is variable over a continuous range in correspondence to varying amplitudes of the applied excitation.

According to the present invention, an electric control system includes a plurality of transfluxors interconnected in a desired fashion. Each of the transfluxors has at least two apertures. Means are provided to set at least a selected one of the transfluxors to an unblocked response condition, and the remaining transfluxors are placed in a blocked response condition. The one unblocked transfluxor can furnish output signals to an output winding in correspondence to input signals applied to an input winding linking one of its apertures. The one transfluxor remains unblocked for an indefinite sequence of input signals. By suitable means, for example, a pulse applied to a shaft means, the unblocked transfluxor is returned to its blocked response condition and a second, selected transfluxor is changed to its unblocked condition. Thereafter, the second transfluxor furnishes output signals corresponding to input signals applied to an input winding linking one of its apertures. Any desired one of the transfluxors can be selected by applying a predetermined number of pulses to the shift means.

A common shift means coupled to all the transfluxors may be used for selecting a desired one of the transfluxors. Also, a pair of shift means each linking an aperture of alternate ones of the transfluxors may be used for selecting a desired one of the transfluxors.

When a common shift means is used, different ones of the transfluxors are coupled by an individual one of a plurality of transfer circuits. The transfer circuits are used to delay the signal produced by the one unblocked transfluxor when it is returned to its blocked condition for a predetermined time. The delayed signal is then applied to a winding of another coupled transfluxor to change this other transfluxor to an unblocked condition.

When a pair of shift means is employed, the output signal produced by one transfluxor, when it is returned to its blocked condition by a signal applied to one shift means, is coupled directly to another of the transfluxors linked by the other shift means.

Various embodiments of electric control systems employing transfluxors are described hereinafter. In some embodiments a system may have a plurality of input windings each linked to a different transfluxor and a common output winding linking all the transfluxors. Other embodiments may have a plurality of output windings each linking a different transfluxor and a common input winding linking all the transfluxors. Still other embodiments may have a plurality of input windings and a like plurality of output windings, with a separate input and a separate output winding each linking one of the transfluxors.

A feedback circuit may be coupled between the last one of the transfluxors and the first one of the transfluxors to form a closed ring. The number of transfluxors in the ring may be odd or even, as desired.

The novel features of the invention, as well as the invention itself, both as to its organization and method of operation will best be understood from the following description, when read in connection with the accompanying drawing, wherein like reference characters refer to like parts, and in which:

Fig. 1 is a schematic diagram of a control system according to the invention that can be operated either as an electric commutator device having a plurality of outputs and a common input, or as an electric distributor device having a plurality of inputs and a common output;

Fig. 2 is a schematic diagram of one form of transfluxor which may be used in practicing the invention;

Fig. 3 is a graph of waveforms useful in explaining the operation of a control system according to the present invention;

Figs. 4 and 5 are schematic diagrams of transfer circuits which may be used in practicing the invention;

Fig. 6 is a schematic diagram of one form of the present invention which employs a plurality of magnetic elements and a pair of shift windings for selecting a desired one of the magnetic elements;

Figure 7:
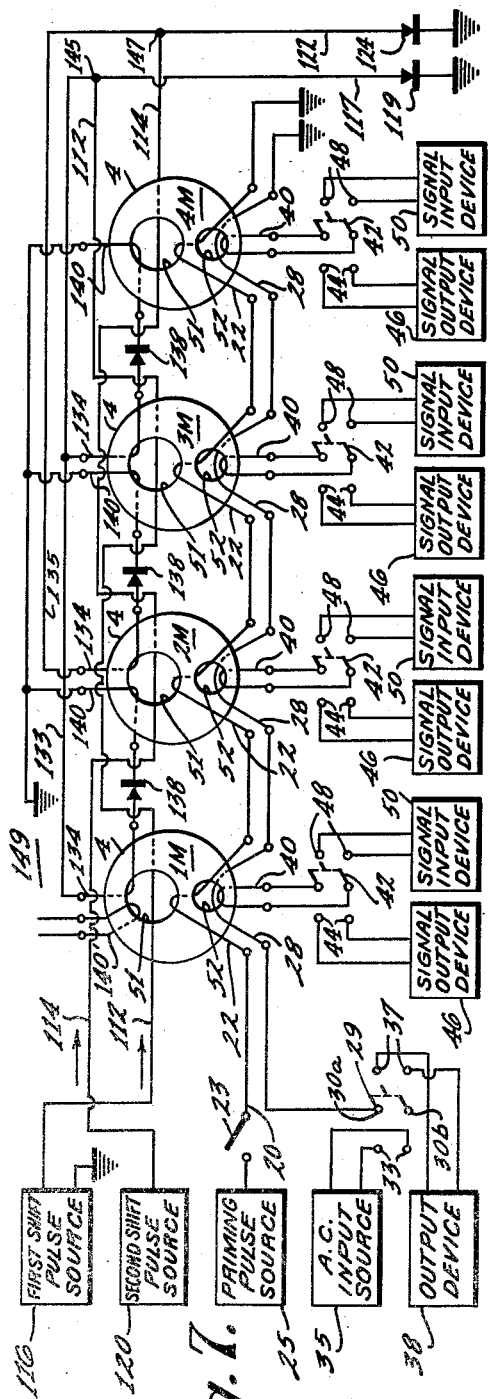
Fig. 7 is a schematic diagram of another form of the present invention which employs a pair of shift windings.

Referring to Fig. 1, an electric control system 2, illustratively, is provided with four different stages designated 1M through 4M, respectively. Included in each stage is a multiapertured magnetic element such as a transfluxor 4. The transfluxor 4 is a two-aperture transfluxor and is one form of the transfluxors described in the aforementioned application Serial No. 473,709, which may be used in practicing the present invention. Each transfluxor has one aperture 51 larger than another aperture 52, which apertures are therefore respectively termed herein the large and small apertures. A common shift means, for example, a shift coil 5, may be coupled to all the transfluxors 4. The shift coil 5 is formed by connecting in series a plurality of shift windings 6, each of which is linked to a different transfluxor 4 through the large aperture 51 thereof. The shift coil 5 has one end connected to a shift pulse source 7 and the other end connected to a common conductor indicated in the drawing by the conventional ground symbol. The transfluxors 4 and the manner in which the shift and other windings are linked thereto are described more fully hereinafter in connection with Fig. 2.

The four stages of the control system may be connected in cascade by means of a plurality of transfer circuits 8. Each transfer circuit 8 couples two successive transfluxors 4 by connecting the input terminals of a transfer circuit 8 to the terminals of a transfer winding 10 through the large aperture 51 of one transfluxor 4 and connecting the output of the transfer circuit 8 to the terminals of a setting winding 12 through the large aperture 51 of a succeeding transfluxor 4.

An additional transfer circuit 8' may be provided to couple the stages 4M and 1M to form a closed ring. In such case a feedback loop 14 connects the output of the transfer circuit 8' to the terminals of a feedback winding 16 of the stage 1M transfluxor 4. A double-pole, single-throw switch 17 may be connected in the feedback loop 14 for selectively coupling the stages 4M and 1M.

The terminals of the setting winding 12' of the stage 1M transfluxor 4 may be connected to a setting pulse source 18. The setting pulse source may be any suitable source for furnishing a setting pulse to the stage 1M transfluxor 4. The setting pulse source 18 and the other pulse sources referred to herein preferably are so-called constant current sources. Examples of known constant current sources include vacuum tube circuits using pentode type tubes and other magnetic circuits using magnetic cores.

A priming coil 20 may be coupled to all the transfluxors 4 by connecting in series a priming winding 22 through the small aperture 52 of each transfluxor 4. A single-pole single-throw switch 23 may be interconnected in the priming coil 20 between the stage 1M transfluxor 4 and a priming pulse source 25 connected to one end of the priming coil 20. The other end of the priming coil 20 is connected to the common ground.

A signal coil 27 is coupled to all the transfluxors 4 by connecting in series a first signal winding 28 through the small aperture 52 of each transfluxor 4. One end of the signal coil 27 is connected to one movable contact 30a of a set of movable contacts 30a, 30b of a reversing switch 29. The other end of the signal coil 27 and the other movable contact 30b of the reversing switch 29 are connected to the common ground. One set of the fixed contacts 33 of the switch 29 is connected to an input pulse source 35. The other set of fixed contacts 37 of the switch 29 is connected to an output device 38.

Each of the transfluxors 4 has coupled thereto a second signal winding 40 through the small aperture 52. The second signal winding 40 of any transfluxor 4 may be used either for selectively distributing input signals to the signal coil 27, or for receiving output signals in accordance with the input signals applied to the signal coil 27. The terminals of each second signal winding 40 are connected to the movable contacts of a corresponding one of the double-pole, double-throw switches 42. One set of the fixed contacts 44 of each switch 42 is connected to a different one of a plurality of signal output devices 46. The other set of fixed contacts 48 of a switch 42 is connected to a different one of a plurality of signal input devices 50.

When the control circuit of Fig. 1 is used to commutate electric signals to a selected output channel, the reversing switch 29 and all the double-pole double-throw switches 42 are thrown to the left (as viewed in the drawing). The input pulse source 35 is thus connected to the signal coil 27 and the individual second signal windings 40 are connected to a corresponding one of the signal output devices 46. The input source 35 may be one arranged to supply symmetrical A. C. pulses to the signal coil 27. The input pulse source 35 may also be arranged to apply input pulses of one polarity, wherein the amplitudes of the input pulses are modulated in accordance with intelligence signals which are to be transmitted selectively to the signal output devices 46. Also, the input pulse source 35 may be arranged to furnish other types of signals, as described more fully hereinafter.

Each signal input device 50 may be arranged to furnish different types of electric signals, similar to the types supplied by input pulse source 35, to a connected second signal winding 40. In such case, the reversing switch 29 and all the double-pole double-throw switches 42 are thrown to the right (as viewed in the drawing). The input signals furnished by the input signal devices 46 are then selectively distributed to the output device 38.

A transfluxor 4, as shown in Fig. 2, may be molded from a magnetic material in the form of a circular-shaped disk having a relatively large diameter aperture 51 and a relatively small diameter aperture 52. The magnetic material is characterized by a substantially rectangular hysteresis loop, for example, a manganese-magnesium ferrite material. The axes of the two apertures may be parallel to one another; and the thickness of the transfluxor 4 may be uniform throughout. The cross-sectional area of the wide leg $l$ located between the inside surface of the setting aperture 51 and the periphery of the disk 4 is made at least equal to the sum of the cross-sectional areas included in the narrow legs $j$ and $k$. The leg $j$ is located between the inside surface of the driven aperture 52 and the periphery of the disk 4; and the leg $k$ is located between the inside surfaces of the large aperture 51 and the small aperture 52. The cross-sectional areas of the legs $j$, $k$ and $l$ are taken at the most restricted portion of the material, which conveniently, may be along a center line $m$—$m'$ of the disk 10. The cross-sectional areas of the legs $j$ and $k$, preferably, are equal to one another.

The two apertures in the transfluxor 4 provide three closed flux paths in the material. These flux paths are shown in Fig. 2 by the dotted lines 53, 54 and 55 including, respectively, only the large aperture 51, both the large aperture 51 and the small aperture 52, and only the small aperture 52. The setting winding 12 is linked to the flux path 53 by threading the setting winding, beginning at the terminal 12a, across the top surface of the transfluxor 4, then through the large aperture 51 (which may therefore be called the setting aperture), and then along the bottom surface of the transfluxor 4 and returning to the terminal 12b. The transfer winding 10 and the shift winding 6 are each linked to the flux path 53 in a similar fashion, beginning with their terminals 10a and 6a, respectively. The first signal winding 28 is linked to the flux path 55 about the small aperture 52 by threading the first signal winding, beginning at the terminal 28a, along the top surface of the transfluxor 4, then through the small aperture 52, and then along the bottom surface of the transfluxor 4 to the terminal 28b. The small aperture 52, because the transfluxor 4 may be considered driven by a source connected to a signal winding through this small aperture, is also called the driven aperture. The second signal winding 40 is also linked to the flux path 55 in a similar manner, beginning at its terminal 40a. The priming winding 22 is linked to the flux path 55 by threading the priming winding, beginning at the terminal 22a, along the top surface of the transfluxor 4, then through the setting aperture 51, then along the bottom surface of the transfluxor 4, then up through the driven aperture 52, and then along the top surface of the transfluxor 4 to the terminal 22b.

A transfluxor 4 can be operated in different modes in accordance with the type of input signals to be controlled and the type of output signals desired. Waveforms associated with several of the possible modes are indicated in qualitative fashion in Fig. 3.

One of these modes, termed herein mode I, is employed when both the positive and negative phases of the input signal are similar. The waveform 67 represents symmetrical, A. C. pulses which are applied to either one of the first and second signal windings of a transfluxor 4; and the waveform 68 represents the corresponding A. C. pulses (if any) induced in the other of the signal windings. Mode I operation is useful, for example, in control systems wherein the output signal of a transfluxor is used to operate a registering or indicated device. If desired, one of the phases of the induced signal may be blocked by a suitably poled unilateral conducting device connected to the other signal winding.

In a second mode of operation, termed herein mode II one of the phases of the A. C. signal applied to a signal winding is modulated in accordance with some desired intelligence. The waveform 70 represents qualitatively asymmetrical input pulses applied to one of the first and second signal windings 28 and 40 of a transfluxor 4 wherein, the amplitude of the positive phase of the A. C. signal is modulated in accordance with the intelligence. All the negative phases of the A. C. signal may have the same amplitude. The signals (if any) induced in the other signal winding of the transfluxor are represented by the waveform 71. Mode II operation is useful, for example, in control systems for multiplexing purposes.

A third mode of operation, termed herein mode III, is also asymmetrical. In this mode the modulated input pulse carrying the intelligence signal is preceded by a priming pulse of limited amplitude, so that substantially no output signal is induced in a signal winding by the priming pulse. Therefore, a flux change is caused by this priming pulse only about the driven aperture 52 along the path 55. The subsequent modulated input pulse, however, induces an output signal in the other signal winding in accordance with the amplitude of the input pulse.

A reset pulse 76 may be used to apply a relatively intense magnetizing force to each of the transfluxors 4. The amplitude of the reset pulse is made sufficiently large to orient the flux in all portions of the legs $j$ and $k$ (Fig. 2) with flux in the same one direction with reference to the setting aperture 51.

By way of example, the reset pulse 76 of Fig. 3 may be applied to the shift winding 6 to produce a current flow into the terminal 6a. The reset pulse produces sufficient magnetizing force to cause a flux change both in the longest flux path 54 (see Fig. 2) about both the setting and the driven apertures 51 and 52, and in the next longest flux path 53 about the setting aperture 51. Upon the termination of the reset pulse 76, all the material in the legs $j$ and $k$ remains saturated at remanence in the same state with reference to the setting aperture 51, because of the rectangular hysteresis characteristic of the material. The reset condition is represented by the solid arrows 80 and 81 in legs $j$ and $k$, respectively. The flux in the wide leg $l$ changes by an amount corresponding to the sum of the flux changes produced in the legs $j$ and $k$, as indicated by the arrows 84 and 85 in the leg $l$. Note, however, that the legs $j$ and $k$ are saturated in opposite states with respect to the flux path 55 about the driven aperture 52.

Accordingly, an input signal applied to either of the signal windings 28 and 40 does not produce any flux change in the path 55 about the driven aperture 52 because one or the other legs $j$ and $k$ is already saturated with flux in the direction of the magnetizing forces produced by the A. C. signal. Thus, substantially no output signal is induced in the other output winding 40 or 28 because there is substantially no flux change in the path about the driven aperture 52. In the reset condition, then, the transfluxor blocks the transmission of A. C. signals applied to the first signal winding 28 from the second signal winding 40, and signals appearing on the second signal winding 40 from the first signal winding 28. For convenience of description, it may be assumed that the positive phase of an A. C. signal applied to one signal winding is in a direction to cause a current flow into the terminal 28a or 40a as the case may be.

It is assumed that the amplitude of the negative phase of the input source signal is limited to a maximum value equal to that amplitude at which some flux change in the longest flux path 54 about the setting and the driven apertures 51 and 52 just occurs. By making the size of the setting aperture 51 larger than the size of the driven aperture 52 more tolerance is allowed in the value of the negative phase of the input source signal which causes a flux change in all portions of the leg $k$ but does not produce flux change along the path 54. Thus, the signal input source or device need not be as carefully regulated as might be the case if both apertures were the same size.

The following theory of operation serves to explain the observed operation of a transfluxor. However, the applicants do not intend to be bound by this theory but present same as an aid in fully and clearly describing the present invention.

Assume that a positive setting pulse 88 of the waveform 87 (Fig. 3) is applied to the setting winding 12 (Fig. 2) in a direction to cause a current flow into the terminal 12b. The amplitude of the setting pulse 88 is regulated to a value which produces a magnetizing force sufficient to cause a flux change in all portions of the near leg $k$, but insufficient to cause a flux change in the distant leg $j$. Upon the termination of the setting pulse 88 the flux in the leg $k$ is reversed to a state opposite to the initial state, as indicated by the dotted arrow 89 in the leg $k$. A corresponding flux change is also produced in the wide leg $l$ by the setting pulse 88 as indicated by the dotted arrow 90 in the leg $l$.

Now, the portions of the flux path 55 about the driven aperture 52 are in the same state with flux oriented in one sense with reference to the driven aperture 52. Accordingly, the first negative phase of an A. C. signal applied to a signal winding produces a flux reversal from the one sense to the opposite sense along the path 55 about the driven aperture 52. The subsequent positive phase of an A. C. signal applied to a signal winding produces a flux change about the driven aperture 55 back to the one sense. The amount of flux change produced by the positive phase varies in accordance with the modulated amplitude of the positive phase. This modulation may be any value between a zero amplitude value corresponding to zero modulation where no flux change is produced in the legs j and k, and a limiting value corresponding to a value which produces a flux change in all portions of the legs j and k. The output pulse amplitude and duration in general are approximately the same as those of the positive, amplitude modulated, input pulse. When the positive input pulse is modulated to have more energy than that required to change all the flux in the legs j and k, the output pulse is somewhat shorter in duration than the positive input pulse. However, the output pulse still has approximately the same amplitude as the positive input pulse. In mode I operation the amplitude of the positive phase preferably causes a flux change in all portions of the legs j and k. Each time a flux change is produced in the path 55, an output voltage is induced across the terminals of the remaining one of the signal windings 28 and 40. The amount of output voltage induced in the remaining signal winding is proportional to the flux change produced by the positive phase of the A. C. input signal. Thus, a train of negative and positive pulses can be applied to a desired one of the signal windings 28 and 40. The information represented by the variations in the amplitude of the positive polarity pulses is transmitted to output device connected to the other of the signal windings 28 and 40. The output device 38 and each of the signal output devices 46 may be any device responsive to signal induced in a corresponding signal winding 28 or 40.

Assume, now, that after any one positive polarity input pulse a positive polarity shift pulse 92 of Fig. 3 is applied to the shift winding 6 in a direction to cause a current flow into the terminal 6a. The current flowing in the shift winding 6 generates a magnetizing force along the path 53 reversing the flux in the legs j and k, and reversing a corresponding amount of flux in the leg l back to the initial clockwise sense with reference to the setting aperture 51. Note, that the legs j and k are now saturated at remanence in opposite states with reference to the driven aperture 55 as indicated by the solid arrows 80 and 81 in the legs j and k, respectively. The transfluxor is thus again placed in its blocked state by the shift pulse 92.

Each time a flux change is produced in the leg l a voltage is induced across the terminals of the transfer winding 10. The induced voltage caused by a setting pulse 88 may be prevented from causing a current flow in the transfer winding by connecting a suitably poled unilateral conducting device to one terminal, for example, the terminal 10a of the transfer winding 10; the unilateral conducting device may be included in a transfer circuit described hereinafter. However, the opposite polarity voltage induced across the terminals of the transfer winding 10 by the shift pulse 92 does produce a current flow in the transfer winding 10. This current is utilized in the present invention, as described hereinafter, for setting another of the transfluxors to its unblocked condition. Note that in setting a transfluxor to its unblocked condition the setting current is limited or regulated by any suitable known means, so that the flux linkages applied to unblock the transfluxor produce substantially no flux change in the leg j. Consequently, there is substantially no voltage induced across the terminals of the signal windings 28 and 40 when a transfluxor is driven to the unblocked condition, and the control sources are then substantially decoupled from the load devices.

Referring again to Fig. 1, first assume that it is desired to operate the control system to commutate the signals supplied by the input source 35 to a selected one of the signal output devices 46. The reversing switch 29 in all the double-pole double-throw switches 42, accordingly, are thrown to the left (as viewed in the drawing) to connect the signal coil 27 to the A. C. input source 35 and connect each signal output device 46 to a corresponding second control winding 40.

In operation, a reset pulse is applied to all the transfluxors 4 by a reset means (not shown). The reset means may be, for example, a coil linking all the transfluxors 4 in a direction to establish a flux in the clockwise sense with reference to the setting aperture 51 in all portions of the narrow legs j and k limiting the driven aperture 52. This reset pulse is maintained for a sufficient period such that any transient voltages caused by flux changes in the transfluxors 4 have ceased before the termination of the reset pulse. The setting pulse source 18 is then activated to apply a suitable pulse to the setting winding 12' of the stage 1M transfluxor 4 to place this transfluxor in its unblocked condition. Any known means of applying a suitable magnetizing force to the stage 1M transfluxor for setting it to an unblocked condition may be employed. Thereafter signals, for example symmetrical A. C. signals, applied to the setting coil 27 induce flux changes around the driven aperture 52 of the stage 1M transfluxor 4. These flux changes induce corresponding output voltages across the terminals of the second signal winding 40 of the stage 1M transfluxor 4. The signals induced in this second signal winding 40 are applied to the signal output device 46 which is coupled to the stage 1M transfluxor 4. The A. C. currents flowing in the signal coil 27 do not produce any substantial flux changes in the remaining transfluxors 4. Accordingly, none of the remaining signal output devices 46 are activated by the signals applied to the signal coil 27. If mode III operation is desired the single-pole, single-throw switch 23 may be closed to connect the priming pulse source 25 to the priming winding 20. Any suitable synchronizing means can be used to synchronize pulses furnished by the input source 35 and the priming pulse source 25.

After any desired time or number of pulses from the input source 35 have been applied to the setting coil 27, the shift pulse source 7 can be activated to apply a shift pulse to the shift coil 5. The shift pulse flows through the shift winding 6 of the stage 1M transfluxor 4 and sets this transfluxor to its blocked condition. The shift current flowing in the remaining shift windings 6 produce substantially no flux changes because these transfluxors 4 are already saturated with flux in the sense of the magnetizing force produced by the shift pulse. The flux change produced in the path about the setting aperture 51 of the stage 1M transfluxor 4 produces a voltage across the terminals of the first transfer winding 10. This voltage causes a current flow into the transfer circuit 8 coupling the stages 1M and 2M. A voltage is also induced in the feedback winding 16, the setting winding 12' and the priming winding 22 which link the path about the setting aperture 51. These voltages, however, do not produce any substantial current flow in these windings, for reasons explained hereinafter.

The transfer circuits 8 may be similar to those used in conventional magnetic core shift registers. Circuits suitable for the transfer circuits 8 are illustrated in Figs. 4 and 5. The transfer circuit of Fig. 4 includes a unilateral conducting device, such as a diode rectifier 100, having its anode connected to the upper terminal 10a of the first transfer winding 10. The cathode of the diode 100 is connected in parallel to one plate of a capacitor 102 and to one terminal of an inductance 103. The other terminal of the inductance 103 is connected through a resistance element 104 to the upper terminal 12b of the setting winding 12 of the stage 2M transfluxor 4. The other plate of the capacitor 102 is connected to a lead 105 which has one end connected to the terminal 10b of the first transfer winding 10 and the other end connected to the terminal 12a of the stage 2M setting winding 12. The lead 105 may be connected to the common ground. A second unilateral conducting device such as the diode rectifier 107 may be connected in shunt with the capacitor 102, with its anode to ground. The diode 107 may be used to bypass undesired currents produced between the stages 2M and 1M, for example, when the stage 2M transfluxor is blocked by a shift pulse. The undesired currents are in a direction to charge the capacitor 102 so as to make its upper plate negative. However, the diode 107 provides a low impedance circuit for the undesired currents.

The desired current flow into the transfer circuit 8 is indicated by the arrow 109. This current is produced when the stage 1M transfluxor 4 is again blocked by the shift pulse. The desired current flows through the diode 100 to charge the capacitor 102 so as to make its upper plate positive. The capacitor 102 discharge current flows through the inductance 103, the resistance 104, and into the terminal 12b of the stage 2M setting winding 12. The RC time constant of the capacitor 102 and the resistance 104 is regulated so that the capacitor discharges for the time required to change the flux about the setting aperture of the stage 2M transfluxor 4. The magnetizing force generated by the discharge current from the capacitor 102 then sets the stage 2M transfluxor 4 to its unblocked response condition.

The transfer circuit of Fig. 5 may also be employed. This transfer circuit is the same as that of Fig. 4 with the exception of the second capacitor 108 having one plate connected to a junction between the inductance 103 and the resistance 104, and having the other plate connected to the grounded lead 105. The two capacitors 102 and 108 and the inductance 103 then comprise a $\pi$ connected delay circuit which may be used for delaying the output of the stage 1M transfluxor 4 for a suitable time interval.

Input source signals applied to the signal coil 27 after the abovementioned delay then cause flux changes about the driven aperture 52 of the stage 2M transfluxor 4. These flux changes induce voltage across the terminals of the second signal winding 40 of the stage 2M and activate the second one of the signal output devices 46. When a second shift pulse is applied to the shift coil 5, the stage 2M transfluxor 4 is blocked and the stage 3M transfluxor is subsequently unblocked in a manner similar to that described for the stages 1M and 2M. Little current flows in the first transfer circuit 8 coupling the stages 1M and 2M, when the stage 2M transfluxor 4 is blocked, because the resistor 104 and the capacitor 102 in this first transfer circuit 8 together have a longer time constant than that offered by the capacitor and diode in the succeeding transfer circuit 8. Therefore, the succeeding transfer circuit 8 capacitor 102 charges before the first transfer circuit 8 capacitor 102 can charge, and the succeeding transfer circuit 8 thus absorbs substantially all the energy of the shift pulse. Also any small current flow produced in the reverse direction is prevented from charging the capacitor 102 by the bypass diode 107, if used. All of the transfluxors 4 or any desired ones of the transfluxors 4 may be placed in their unblocked condition by applying a suitable number of setting pulses to the setting winding 12'. Each of these setting pulses is applied subsequent to a shift pulse, and preferably, before the input source 35 signals.

When it is desired to circulate the unblocked condition to single, successive ones of the stages, or a pattern of unblocked conditions to various stages, the feedback loop 14 is closed by throwing the single-pole, double-throw switch 17 to the right (as viewed in the drawing). The output of the stage 4M transfluxor 4 then is fedback to the feedback winding 16 of the stage 1M transfluxor 4 through the transfer circuit 8'. The feedback winding 16 is linked through the setting aperture 51 of the stage 1M transfluxor 4 in the same manner as the setting winding 12'. The current flow in the feedback winding 16 then unblocks the stage 1M transfluxor 4. Any desired pattern of blocked and unblocked transfluxors can be circulated in this manner.

When it is desired to operate the control system 2 as a multiplexing device the reversing switch 29 and all the double-pole, double-throw switches 42 are thrown to the right (as viewed in the drawing). The signal coil 27 is thus connected to the output device 38 and each signal input device 50 is coupled to a corresponding one of the transfluxors 4. A selected one of the transfluxors is then unblocked as described previously. Signals applied to the second signal winding 40 of the selected transfluxor, by the corresponding signal input device 50, then induce voltages across the terminals of the first signal winding 28 of the selected transfluxor 4. A voltage of one polarity is induced in a first signal winding 28 by input signals of one polarity in a second signal winding 40; and a voltage of the opposite polarity is induced in a first signal winding 28 by input signals of the other polarity in a second signal winding 40. These induced signals are applied to the output device 38. Thus, by initially unblocking the stage 1M transfluxor 4, the input signals of the signal input devices 50 are successively distributed to the output device 38 in accordance with the shift pulses applied to the shift coil 5.

Note that the one polarity voltages induced across the terminals of the second signal winding 28 of the selected transfluxor 4 cause a load current $I_1$ to flow in the signal coil 27. The load current $I_1$ is in a direction to produce a flux change in the legs $j$ and $l$ along the longest flux path 54 (Fig. 2). In the case of a low impedance load device 38 the current $I_1$ may generate sufficient magnetizing force to cause a non-selected transfluxor 4 to become unblocked by reversing some or all of the flux in the leg $j$. By providing a high impedance load in the output device 38, the load current $I_1$ is limited to a value less than that required for causing a flux change along the longest path. When a high impedance output load is employed the modulation representing the intelligence is transmitted essentially by voltage changes produced in the output device 38.

When the control system is used for commutating electric signals, the signal output devices 46 are preferably ones having a low impedance. The signals applied to the signal coil 27 may be then modulated above a given steady value. The steady value is that required to produce a flux change in all portions of the legs $j$ and $k$ of the selected transfluxor 4. In such case the transmission of the electric signals is primarily by current modulation and is analogous to the operation of a conventional power transformer. That is, the magnetizing current required for saturating the material in the legs $j$ and $k$ is furnished by the steady value of the applied signal and the modulated portion of the applied signal operates to overcome the demagnetizing effect produced by the induced load current.

The control system 110 of Fig. 6, illustratively, has four stages 1M–4M and employs a pair of shift means comprising a first shift coil 112 and a second shift coil 114 for successively unblocking the transfluxors 4. One extreme end of the first shift coil 112 is connected to a first shift pulse source 116 and is passed alternately downwardly through the setting aperture 51 of each odd stage transfluxor 4, and downwardly through the driven aperture 52 of each even stage transfluxor 4. The other extreme end of the first shift coil 112 is connected via a first lead 117 to a first unilateral conducting device, such as a first diode rectifier 119. The diode 119 has its anode connected to the first lead 117 and its cathode connected to the common ground.

One extreme end of the second shift coil 114 is connected to a second shift pulse source 120. The second shift coil 114 is passed alternately downwardly through the setting aperture 51 of each even stage transfluxor 4 and downwardly through the driven aperture 52 of each odd stage transfluxor 4. The other extreme end of the second setting coil 114 is connected via a second lead 122 to a second unilateral conducting device, such as a diode rectifier 124. The diode 124 has its anode connected to the second lead 122 and its cathode connected to the common ground.

The stages are coupled together by means of interstage coupling circuits. Each interstage coupling circuit comprises a series circuit including a transfer winding 134 linking the setting aperture 51 of the transfluxor 4 of one stage, a unilateral conducting device, such as an interstage diode rectifier 138, and a setting winding 140 linking the setting aperture 51 of the transfluxor 4 of a succeeding stage. The anode of an interstage diode 138 is connected to one terminal of the transfer winding 134 of the transfluxor 4 of one stage, and the cathode is connected to one terminal of the setting winding 140 of the transfluxor 4 of a succeeding stage.

Separate ones of a plurality of load devices 142 may be connected between a common ground lead 143 and the other terminal of respective ones of the setting windings 140. The other terminal of each transfer windings 134 of each odd stage transfluxor 4 is connected to a first shift bus 133; and the other terminal of each transfer windings 134 of each even stage transfluxor 4 is connected to a second shift bus 135. The first shift bus 133 has one extreme end connected to the transfer winding 134 of the stage 1M transfluxor 4 and the other extreme end connected to a junction 145 between the first shift coil 112 and the first lead 117. The second shift bus 134 has one extreme end connected to the transfer winding 134 of the stage 2M transfluxor 4 and the other extreme end connected to a junction point 147 between the second shift coil 114 and the second lead 122.

In operation, an odd stage transfluxor 4 is shifted from the unblocked to its blocked response condition by applying a shift pulse to the first shift coil 112 in the direction of the arrow adjacent thereto. This shift pulse passes through the setting and driven apertures 51 and 52 of each respective odd and even stage transfluxor 4 in a direction to establish flux in the clockwise sense about each linked setting aperture 51 and in the clockwise sense about each linked driven aperture 52, as described previously in connection with Fig. 2. The voltage induced across the terminals of a transfer winding 134 when a transfluxor is returned to its unblocked condition is in a direction to bias the connected diode 119 to substantial cutoff. Therefore, the shift current flows through the path including the first shift bus 133, an interstage diode 138, the transfer winding 134 of the presently unblocked odd stage transfluxor 4, the setting winding of a succeeding even stage transfluxor 4, and the connected load device 142 to the common ground. The current flow in the setting winding 140 of the succeeding even stage transfluxor 4 induces a flux in the counterclockwise sense about its setting aperture 51. The diode rectifiers 138 in the interstage coupling circuits are poled to block current flow from one stage to a preceding stage. If all the transfluxors 4 are blocked at one time the shift pulse is bypassed to ground by the diode 119 which operates as a clamping diode and substantially no current flows in the interstage coupling circuits.

For example, assume that the stage 1M transfluxor 4 is initially unblocked by any suitable means, for example a pulse applied to a setting winding 140' linking its setting aperture 51. The first shift pulse applied to the first shift coil 112 returns the stage 1M transfluxor 4 to its blocked condition. The current flow in the setting winding 140 of the stage 2M transfluxor 4 causes a flux change in one direction in all portions of the leg $k$ of this stage 2M transfluxor 4. The magnetizing force produced around the driven aperture 52 of the stage 2M transfluxor 4 by the shift pulse, in the first shift coil 112 maintains the leg $j$ saturated with flux in the clockwise sense. Thus no flux reversal is produced in the leg $j$ of the stage 2M transfluxor 4 by the current flowing in the setting winding 140 of the stage 2M transfluxor 4. Consequently, the shift current can be employed to unblock the stage 2M transfluxor 4 and to deliver a current to the connected load device 142. The load device 142 may have a relatively low impedance and may draw a relatively large load current.

Similarly, when the stage 2M transfluxor 4 is returned to its blocked condition by a shift pulse applied to the second shift coil 114 by the second shift pulse source 120. The current flow into the setting winding 140 of the stage 3M transfluxor 4 does not produce any flux change in the leg $j$ because of the magnetizing force produce around the driven aperture 52 of the stage 3M transfluxor 4 by the current flow in the second shift coil 114. In shifting an even stage transfluxor 4 to its unblocked condition, the second diode 124 is biased to cutoff by the voltage induced across the terminals of the transfer winding 134 of an even stage.

The control system of Fig. 6 may be operated to couple a selected first signal winding 28 and a selected second signal winding 40 as described in connection with Fig. 1. Thus, signals applied to the signal input coil 27 may be selectively commutated to desired ones of the signal output devices 46. Also signals applied to the respective signal windings 40 by the respective signal input devices 50 may be selectively distributed to the output device 38.

One specific, illustrative embodiment of the configuration of Fig. 6 employs thirty different stages of the transfluxors 4. Each transfluxor 4 in a stage consists of a stack of seventeen transfluxor units. Each transfluxor unit is made from a rectangular hysteresis loop magnetic material consisting of .3MgO, .3MnO and .4Fe$_2$O$_3$. Each unit is .140 inch thick and .346 inch in overall diameter. The diameter of the setting aperture 51 is .138 inch and the diameter of the driven aperture 52 is .043 inch. The center of the setting aperture 51 is located .017 inch above the center of the disk, and the center of the driven aperture 52 is located .1125 inch below the center of the disk.

For convenience of drawing, the various windings linking a transfluxor 4 are each shown as a single-turn winding. It is understood, however, that multi-turn windings may be employed in the embodiment of Fig. 6 and in the other embodiments of the invention described herein. In the specific embodiment of Fig. 6 the various windings are as follows: the first shift coil 112 has 10 turns wound through the setting aperture 51 of each odd stage transfluxor 4, and 3 turns wound through the driven aperture 52 of each even stage transfluxor 4 and, vice versa, for the second shift coil 114; each setting winding 140 has 5 turns wound through the setting aperture 51 of a transfluxor 4; each transfer winding 134 has 40 turns wound through the setting aperture 51 of a transfluxor 4; each first signal winding 28 has 4 turns, and each second signal winding has 5 turns wound through the driven aperture 52 of each transfluxor 4; and each priming winding 22 has 4 turns wound about the material between a setting aperture 51 and a driven aperture 52 of a transfluxor 4.

Each load device 142 has an impedance of 100 ohms. The electrical characteristics of the pulses applied to the respective windings are as follows: each shift pulse is of approximately 6 amperes amplitude and of 50 microseconds duration with rise and fall times of 10 microseconds, and a flat portion of 30 microseconds; a shift pulse causes a current pulse of approximately 1 ampere amplitude and of 10 microseconds duration in an interstage circuit. That current pulse flows through the setting winding 140 of the next succeeding transfluxor 4, and through the connected 100 ohm load 142; each prime pulse is of approximately .3 ampere amplitude and of 7 microseconds duration with rise and fall times of 1 microsecond and a flat portion of 5 microseconds; the modulated pulses applied to a signal winding varied between 0 and 0.5 ampere in amplitude and are of approximately 6 microseconds duration with 1 microsecond rise and fall times; the output pulses induced in the other of the signal windings are of approximately the same amplitude as the corresponding input pulses and of approximately 5 microseconds duration with a 2 microsecond flat portion.

The control system 149 of Fig. 7 is similar to the control system of Fig. 6 with the exceptions that no load devices 142 are connected in the interstage coupling circuits and that the first and second shift coils 112 and 114 link only alternate ones of the transfluxors 4. Due to the absence of the load devices 142 drawing a heavy load current, no additional current need be passed through the driven apertures 52 to insure that all portions of the leg *j* of the transfluxors remain saturated with flux in the initial direction when a transfluxor is unblocked. The circuit of Fig. 7 operates the same as that of Fig. 6, and a selected one of the transfluxors 4 is unblocked by applying a suitable number of shift pulses to the first and second shift coils 112 and 114.

Figure 8:
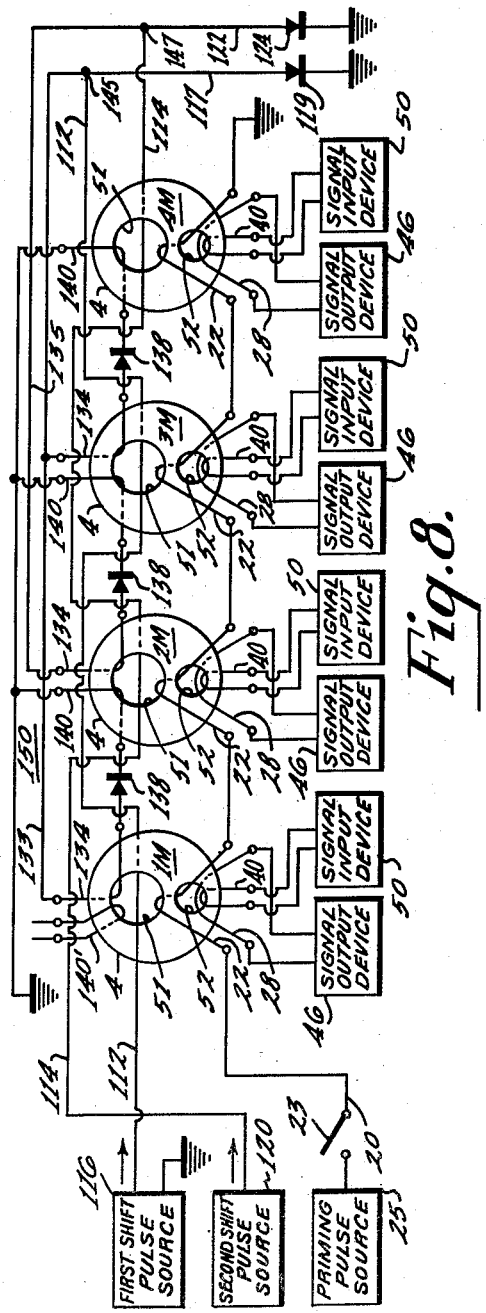
Fig. 8 is a schematic diagram of another form of the invention which is provided with a plurality of input channels and a corresponding plurality of output channels.

The control system 150 of Fig. 8 has one signal input device 50 and one signal output device 46 for each stage. A desired signal input device 50 of one stage activates the signal output devices 46 of the same one stage selectively in accordance with the shift pulses applied to the shift means coupled to all the transfluxors. The signal input devices 46 may furnish modulated intelligence signals or other desired types of signals to the corresponding signal output devices. A priming coil 20 may link all the transfluxors 4, for example, if a mode III type operation is desired. The shift means may be a pair of shift coils as shown in Fig. 6 or a single shift coil as shown in Fig. 1.

The operation of the control system 150 is similar to the operation of the control systems of Figs. 1 and 6. The control system 150 may be useful, for example, in multiplexing operations. Each transfluxor 4 may operate in a manner analogous to a latching relay with the exception that a transfluxor 4 maintains a desired setting without requiring any holding power. Desired ones of the signal input device 50 are commutated to the corresponding output devices 46 in accordance with the frequency of application of shift pulses to the shift means.

There has been described herein improved electric control systems for commutating and distributing A. C. signals by the use of magnetic elements, for shifting to and selectively coupling a desired pair of signal windings. Various types of A. C. signals can be controlled in accordance with the mode of operation selected for the individual magnetic elements. The input source current may be either cyclic or aperiodic, as desired. A closed ring having either an odd or even number of stages may be obtained by coupling the output of the last stage back to the input of the first stage.

What is claimed is:

1. An electric control system comprising a plurality of multi-apertured magnetic elements of substantially rectangular hysteresis loop magnetic material, a signal coil linking all said elements, a plurality of individual signal windings each linking a different one of said elements, and shift means linking all said elements for selectively coupling said signal coil and a selected one of said signal windings.

2. A control system for selectively commutating electric signals comprising a plurality of transfluxors each having first and second apertures, a plurality of first and second signal windings, a different first and second signal winding being linked to the material around said first aperture in each transfluxor, a shift winding linked to the material around said second aperture in each transfluxor, and transfer means for interconnecting said plurality of transfluxors.

3. A control system comprising a plurality of magnetic elements, each having a plurality of apertures and flux paths around said apertures, said elements being interconnected by a first electric circuit linking at least one aperture in each of said elements, said elements each having active and inactive states to alternating magnetizing forces applied along a flux path around one of said apertures, means for setting said system to have at least one of said elements in an active state and the remaining elements in an inactive state, and means for applying a pulse signal to said first electric circuit for changing the state of certain of said elements.

4. A system for distributing input signals received from a plurality of signals input devices to a common signal coil comprising a plurality of transfluxors each having at least two apertures, a signal input winding on each transfluxor for applying said input signals to said transfluxors, a common coil linking all said transfluxors for receiving said input signals, and means linking all said transfluxors for selectively placing a desired one of said transfluxors in an unblocked condition, whereby input signals received on said signal winding of said unblocked transfluxor are transmitted to said common coil.

5. An electric control system comprising a plurality of multi-apertured magnetic elements of substantially rectangular hysteresis loop magnetic material, means connecting said elements in cascade by connecting a first winding through a first of said apertures of one of said elements to a second winding through a first of said apertures in another of said elements in succession, a different first and a different second signal winding linking said elements, and shift means linking all said elements through said first aperture in each of said elements for selectively coupling said first and second signal windings of a selected one of said elements.

6. An electric control system comprising a plurality of transfluxors having two apertures, different first and second signal windings being linked to each of said transfluxors by coupling one first and one second signal winding through a first of said apertures in each of said transfluxors, and first and second shift coils, said first shift coil being linked through the first of said apertures of certain ones of said transfluxors and through the second of said apertures of certain others of said transfluxors, and said second shift coil being linked through the second aperture of said certain ones of said transfluxors and through said first apertures in said certain others of said transfluxors.

7. An electric control system comprising a plurality of multi-apertured magnetic elements of substantially rectangular hysteresis loop magnetic material, a signal coil linking all said elements, a plurality of individual signal windings each linking a different one of said elements, and first and second shift means alternately linking successive ones of said elements for selectively coupling said signal coil and a selected one of said signal windings.

8. An electric control system comprising a plurality of multi-apertured magnetic elements of substantially rectangular hysteresis loop magnetic material, a signal coil linking all said elements, a plurality of individual signal windings each linking a different one of said elements, a plurality of transfer circuits, a different transfer circuit connecting successive ones of said elements, and shift means linking all said elements for selectively coupling said signal coil and a selected one of said signal windings.

9. An electric control system comprising a plurality of multi-apertured magnetic elements of substantially rectangular hysteresis loop magnetic material, a signal coil linking all said elements, a plurality of individual signal windings each linking a different one of said elements, a plurality of transfer circuits, a different transfer circuit connecting successive ones of said elements and including a transfer circuit connecting the last one of said elements and the first one of said elements, and shift means linking all said elements for selectively coupling said signal coil and a selected one of said signal windings.

10. An electric control system comprising a plurality of multi-apertured magnetic elements of substantially rectangular hysteresis loop magnetic material, a signal coil linking all said elements, a plurality of individual signal windings each linking a different one of said elements, a plurality of transfer circuits, a different transfer circuit connecting successive ones of said elements, and first and second shift means linking alternate ones of said elements for selectively coupling said signal coil and a selected one of said signal windings.

11. An electric control system comprising a plurality of transfluxors having two apertures, a signal coil being linked to all said elements by coupling said signal coil through a first of said apertures in each of said elements, a plurality of signal windings, separate ones of said signal windings being coupled to respective ones of said elements through a first of said apertures in each of said elements, a plurality of shift windings, separate ones of said shift windings being coupled to respective ones of said elements through a second of said apertures in each of said elements, and a priming coil being linked to all said elements by coupling said priming coil through said first and second apertures in each of said elements.

12. An electric control system comprising a plurality of multi-apertured magnetic elements of substantially rectangular hyteresis loop magnetic material, a plurality of first signal windings, a plurality of second signal windings, a respective one of said first signal windings and a respective one of said second signal windings linking a respective one of said elements, and shift means linking all said elements for selective coupling said first and second signal windings through the magnetic material of a selected one of said elements.

13. A control system comprising a plurality of transfluxors each having two apertures; a plurality of first signal windings, separate ones of said first signal windings being linked to respective ones of said transfluxors; a plurality of second signal windings, separate ones of said second signal windings being linked to respective ones of said transfluxors; a plurality of first and second devices, said devices being of two kinds, namely, input and output devices; means for connecting said first signal windings to one kind of said first devices; means for connecting said second signal windings to respective ones of the other kind of said devices; and means for selectively coupling said first and second signal windings of a selected one of said transfluxors.

14. An electric control system comprising a plurality of two-apertured transfluxors, a signal coil, a plurality of signal windings, said signal coil being linked to all said transfluxors by coupling said signal coil through a first of said apertures in each of said transfluxors, separate ones of said signal windings being coupled to respective ones of said transfluxors through said first apertures in said elements, and a plurality of shift windings, separate ones of said shift windings being coupled to respective ones of said elements through a second of said apertures in said transfluxors.

15. An electric control system comprising at least two magnetic elements each fabricated from magnetic material characterized by having a substantially rectangular hysteresis loop, each element having a plurality of flux paths and each element having a blocked and an unblocked response condition to signals applied along a selected one of said flux paths, a transfer circuit connecting said elements by linking at least one of said flux paths in each element, and means for applying a magnetizing force along all said linked flux paths in a direction to change each element from an unblocked to a blocked response condition, whereby the signal furnished to said transfer circuit when one of said elements is changed from an unblocked to a blocked condition is in a direction to cause said other element to change from a blocked to an unblocked condition.

16. A control system for selectively commutating electric signals applied to a plurality of first windings to a selected one of a plurality of second windings comprising a plurality of transfluxors each having at least two apertures, a separate one of said first and a separate one of said second windings each being threaded through a first of said apertures in each transfluxor, a plurality of shift windings, a different one of said shift windings being threaded through the second aperture in each transfluxor, means for placing a selected one of said transfluxors in an unblocked condition, said selected transfluxor being operable to magnetically couple one of said first and one of said second windings, means for applying selectively an excitation to said shift windings for blocking said selected transfluxor, and transfer means coupling said selected transfluxor and another of said transfluxors, said transfer means being operable to place said other transfluxor in an unblocked condition a predetermined time after said one transfluxor is placed in its blocked condition.

17. An electric control system comprising a plurality of magnetic elements, each element being formed from a magnetic material characterized by having a substantially rectangular hysteresis loop, and each element having a plurality of apertures in said material, said elements being further characterized by having a plurality of response conditions to magnetizing forces applied to the material bounding one of said apertures, said response conditions including an unblocked and a blocked response condition to said applied magnetizing forces, a common shift means on all said elements for applying a different magnetizing force to the material bounding another different aperture of each element in a direction to set each element to a blocked response condition, and circuit means interconnecting different ones of elements for applying a further magnetizing force to the material bounding one of said apertures to set one of said interconnected elements in an unblocked response condition when another of said interconnected elements is set to a blocked response condition.

18. An electric control system comprising a plurality of magnetic elements, each element being characterized by having a substantially rectangular hysteresis loop, and each element having a plurality of apertures therein and closed flux paths about said apertures, a first of said apertures having a larger circumferential dimension than the others of said apertures, a plurality of first and second signal windings, different ones of said first and second signal windings being linked to respective ones of said elements through a second of said apertures in each of said elements, a plurality of shift windings, different ones of said shift windings being linked to respective ones of said elements through said first aperture in each of said elements, means for applying simultaneously an excitation to said shift windings for producing a magnetizing force in one direction along a flux path about said first aperture in each of said elements, and means responsive to a flux change along said first aperture flux path in one of said elements for producing a magnetizing force in the direction opposite the one direction along said first aperture flux path in a second of said elements, thereby coupling said first and second signal windings of said second element.

19. An electric control system comprising a plurality of transfluxors having two apertures, different first and second signal windings being linked to each of said transfluxors by coupling one first and one second winding through a first of said apertures in each of said transfluxors, first and second shift coils, said first shift coil linking the first of said apertures of certain ones of said transfluxors and the second of said apertures of certain others of said transfluxors, said second shift coil being linked through the second aperture of said certain ones of said transfluxors and through said first apertures in said certain others of said transfluxors, and a priming coil, said priming coil being linked through said first and said second apertures in each of said elements.

References Cited in the file of this patent

UNITED STATES PATENTS

| | | |
|---|---|---|
| 2,519,426 | Grant | Aug. 22, 1950 |
| 2,614,167 | Kamm | Oct. 14, 1952 |
| 2,640,164 | Giel et al. | May 26, 1953 |
| 2,708,722 | Wang | May 17, 1955 |

OTHER REFERENCES

EDVAC Progress Report #2, June 30, 1946 (pages 4–22, 4–23, PY–O–164, PY–O–165).

Nondestructive Sensing of Magnetic Cores by D. A. Buck and W. I. Frank, published in Communications and Electronics, January 1954, pages 822–830.